Oct. 12, 1943.   T. N. CARTER   2,331,765
TENSION CONTROL MECHANISM
Filed July 29, 1942   7 Sheets-Sheet 1
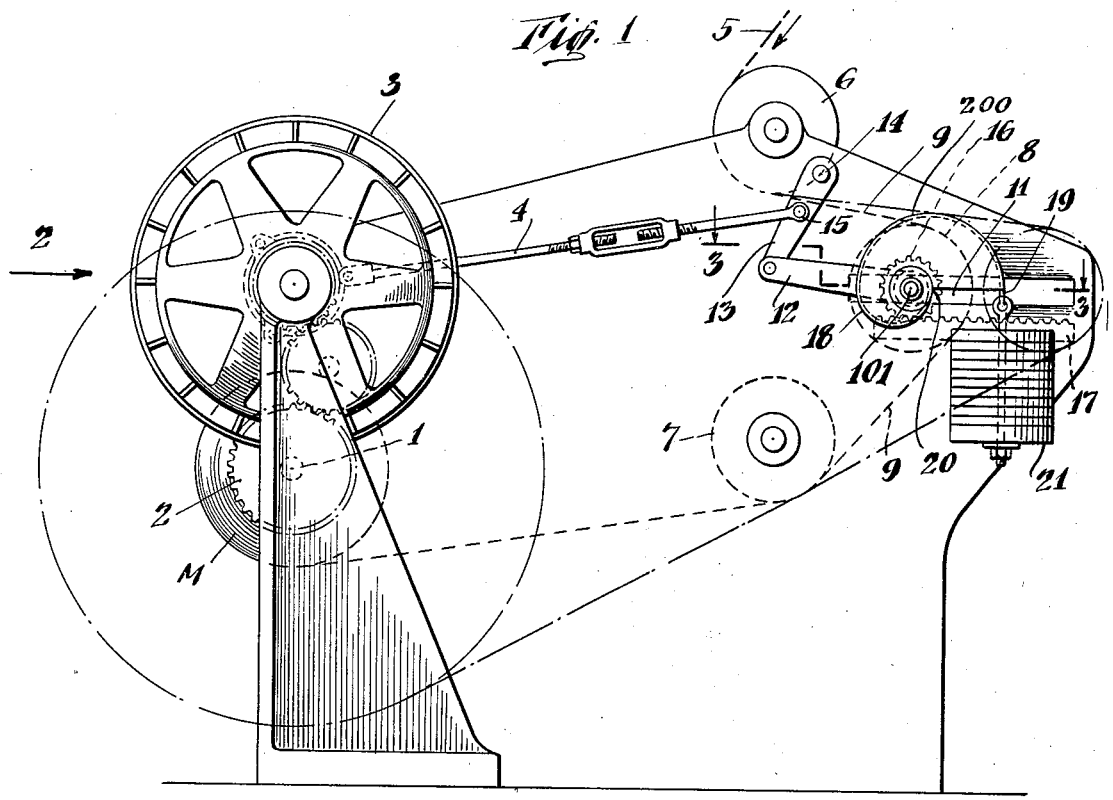
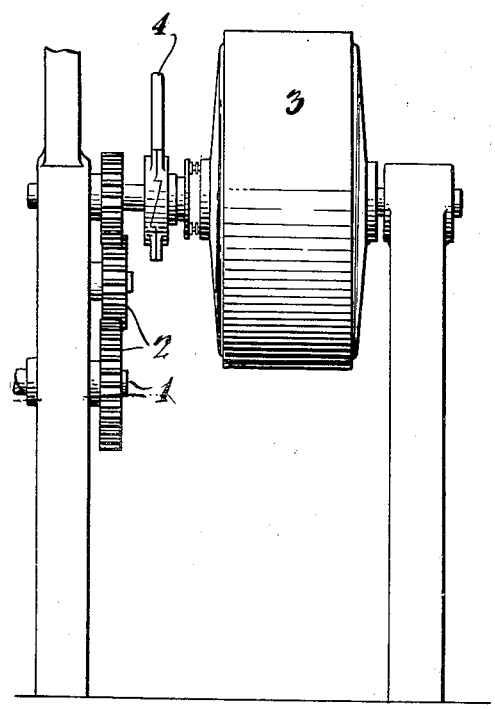
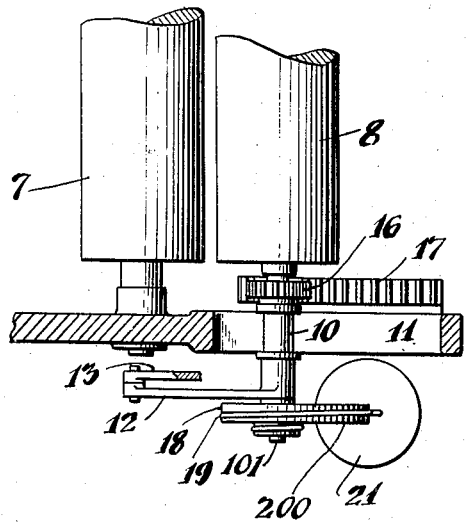
INVENTOR.
Thomas N. Carter
BY
ATTORNEY Oct. 12, 1943.    T. N. CARTER    2,331,765
TENSION CONTROL MECHANISM
Filed July 29, 1942    7 Sheets-Sheet 2
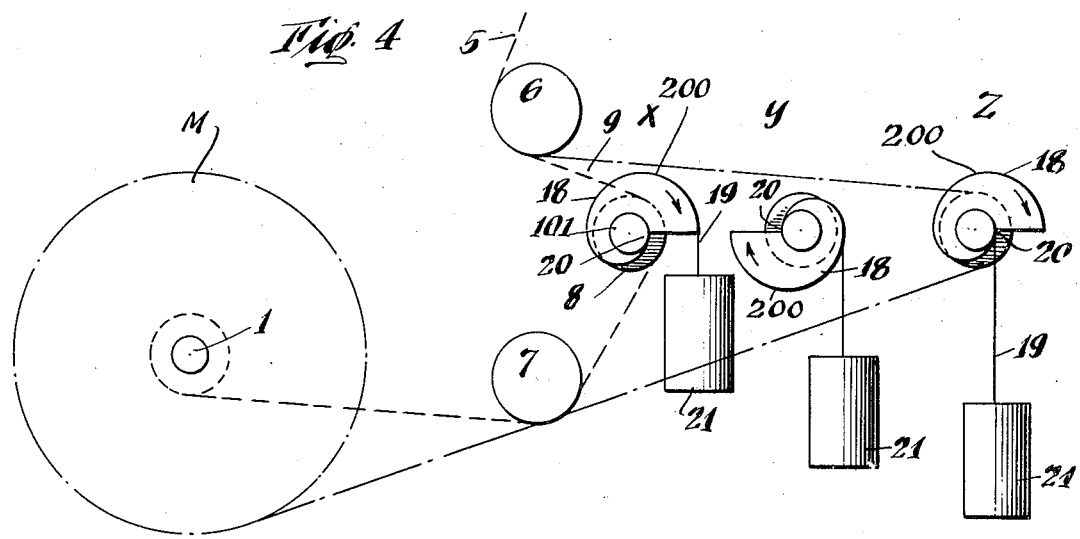
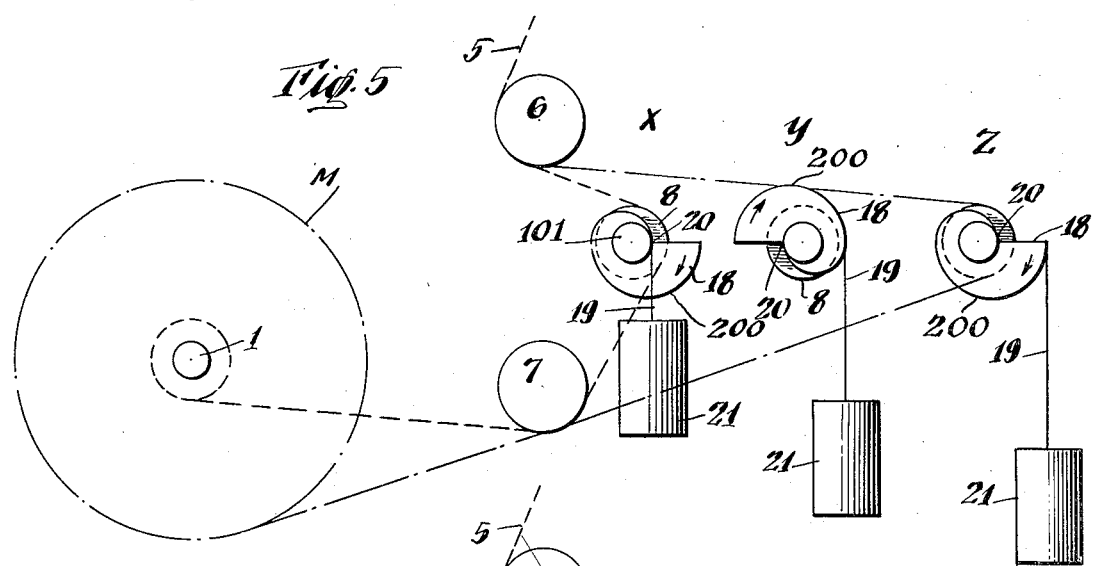
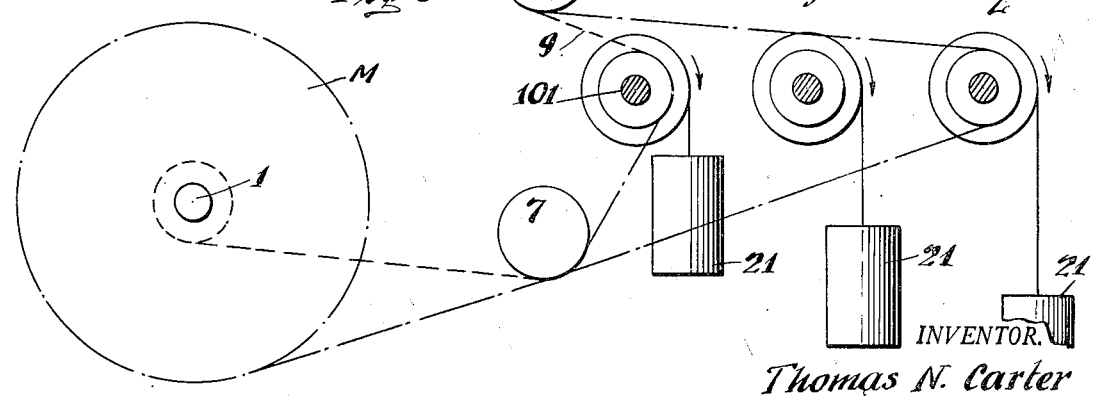
INVENTOR.
Thomas N. Carter
BY
ATTORNEY Oct. 12, 1943.    T. N. CARTER    2,331,765
TENSION CONTROL MECHANISM
Filed July 29, 1942    7 Sheets-Sheet 3

INVENTOR.
Thomas N. Carter
BY
ATTORNEY

Oct. 12, 1943.　　　T. N. CARTER　　　2,331,765
TENSION CONTROL MECHANISM
Filed July 29, 1942　　　7 Sheets-Sheet 4
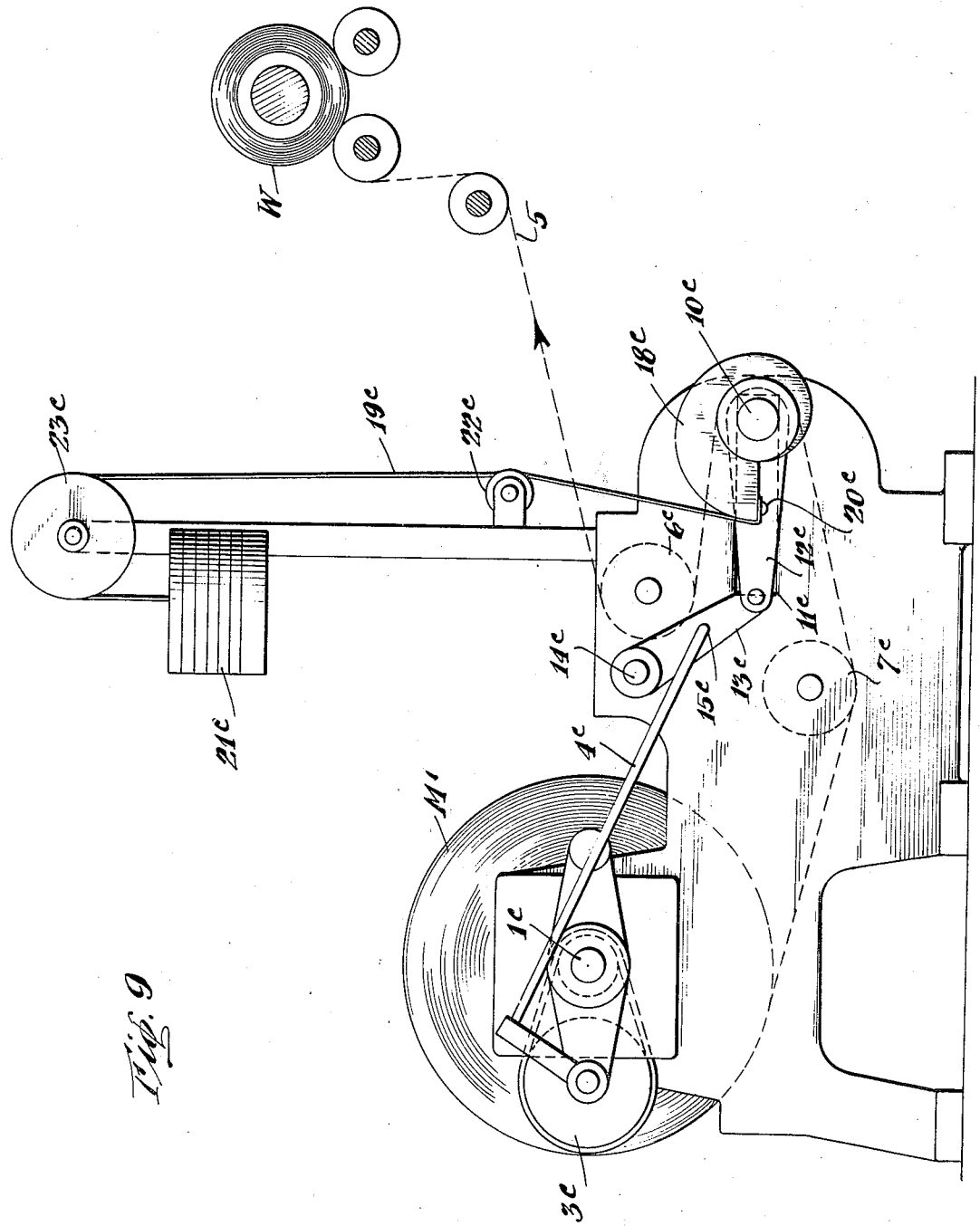
INVENTOR.
Thomas N. Carter
BY
ATTORNEY Oct. 12, 1943.  T. N. CARTER  2,331,765
TENSION CONTROL MECHANISM
Filed July 29, 1942  7 Sheets-Sheet 5
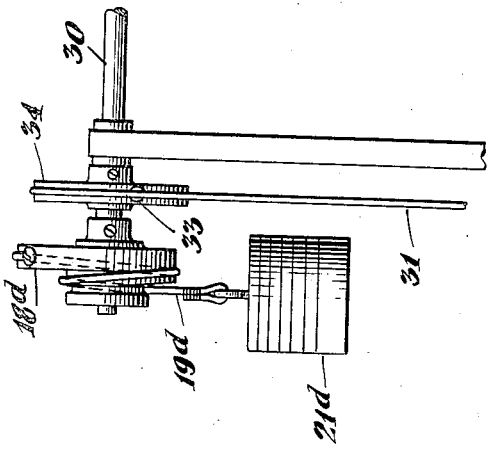
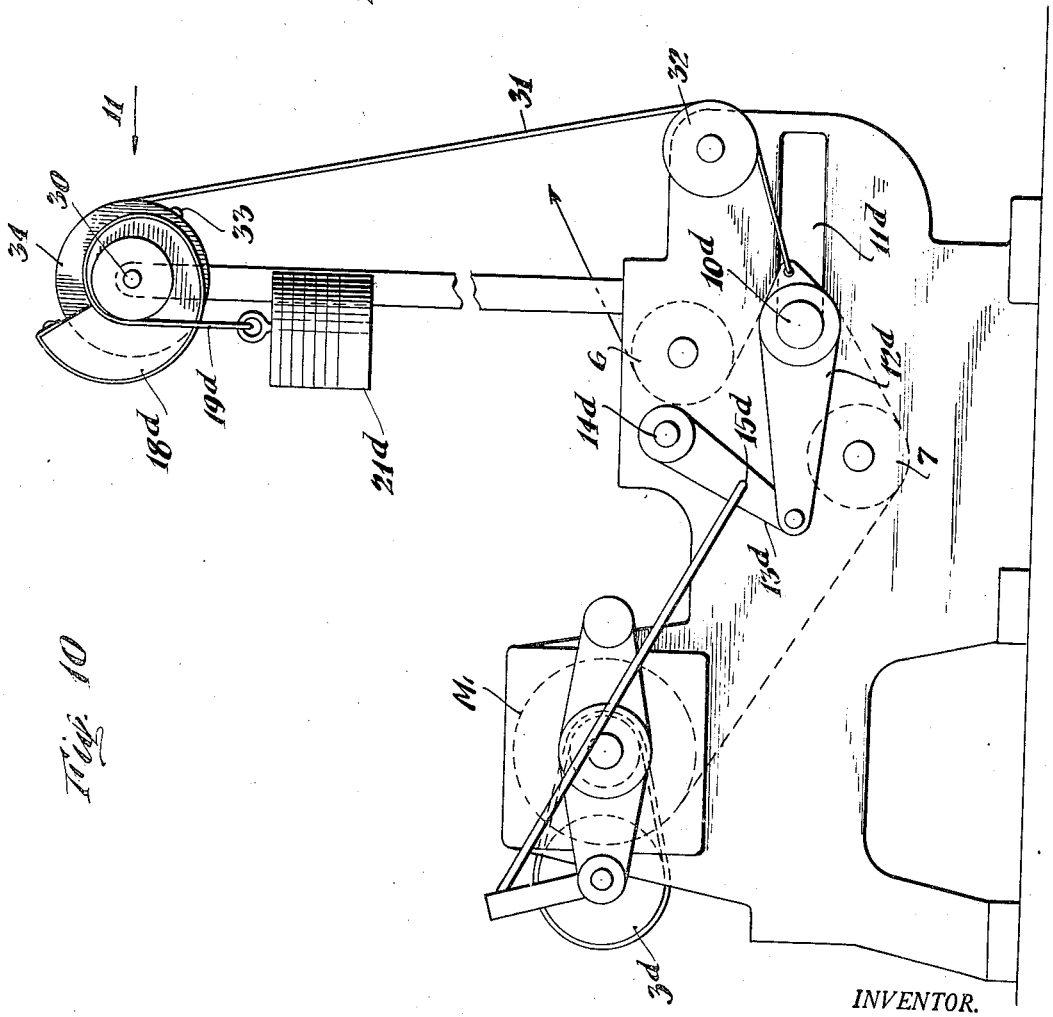
INVENTOR.
Thomas N. Carter
BY
ATTORNEY

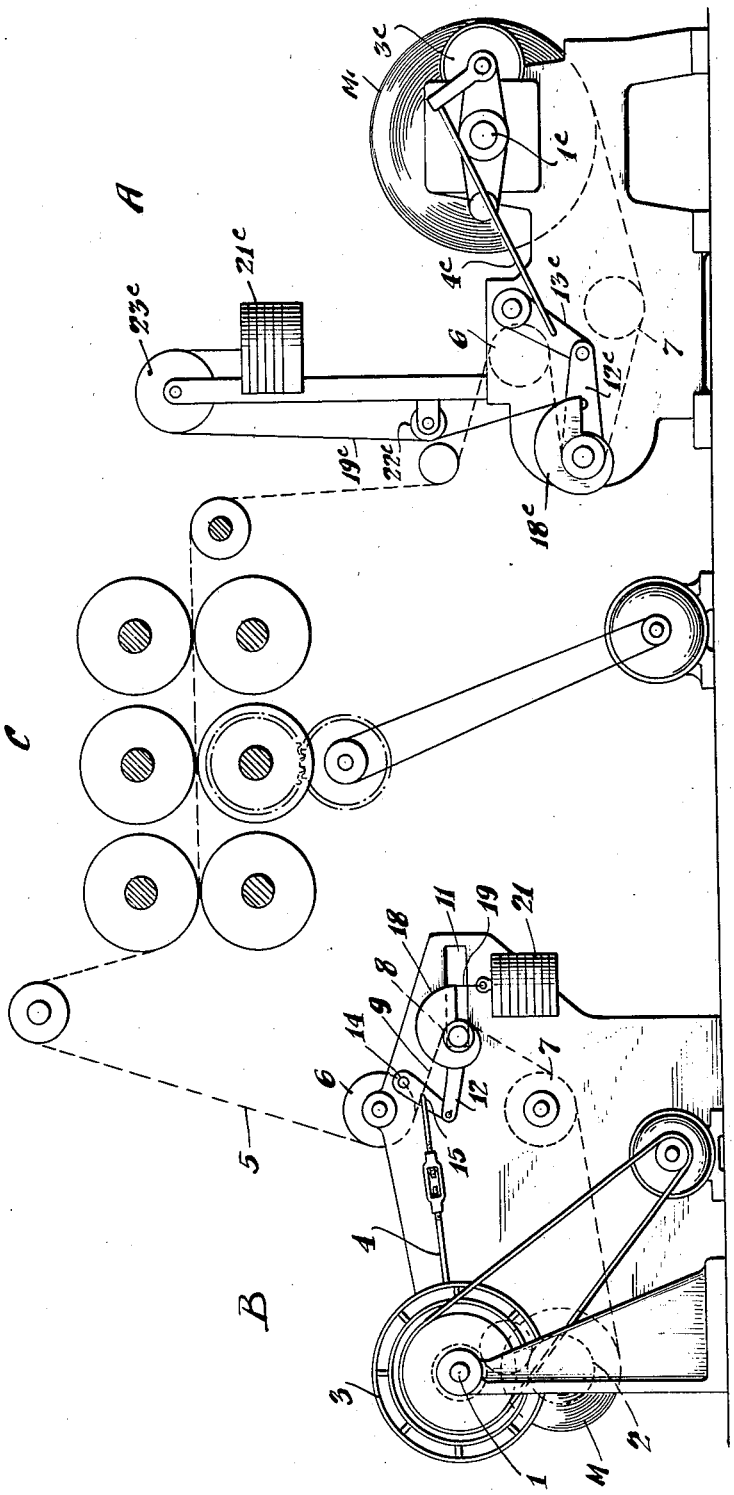

Oct. 12, 1943. T. N. CARTER 2,331,765
TENSION CONTROL MECHANISM
Filed July 29, 1942 7 Sheets-Sheet 7
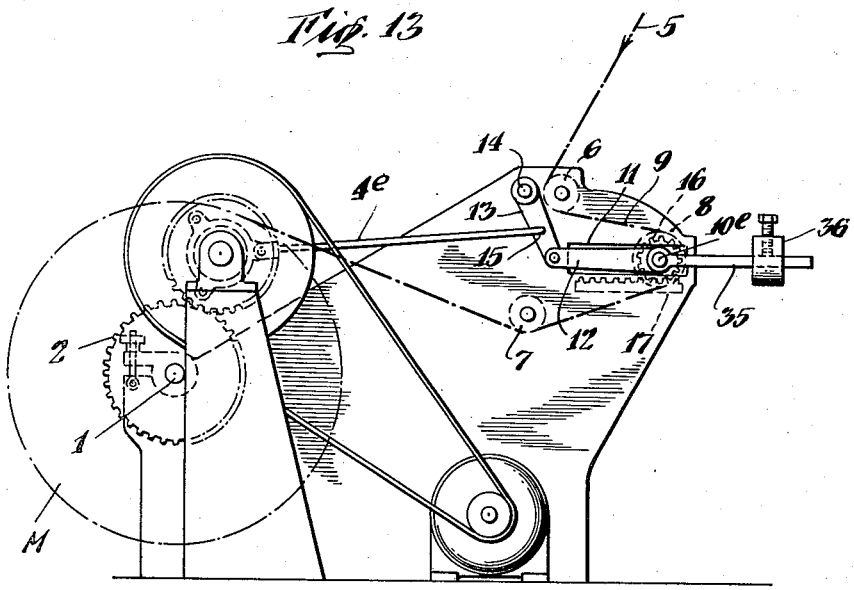
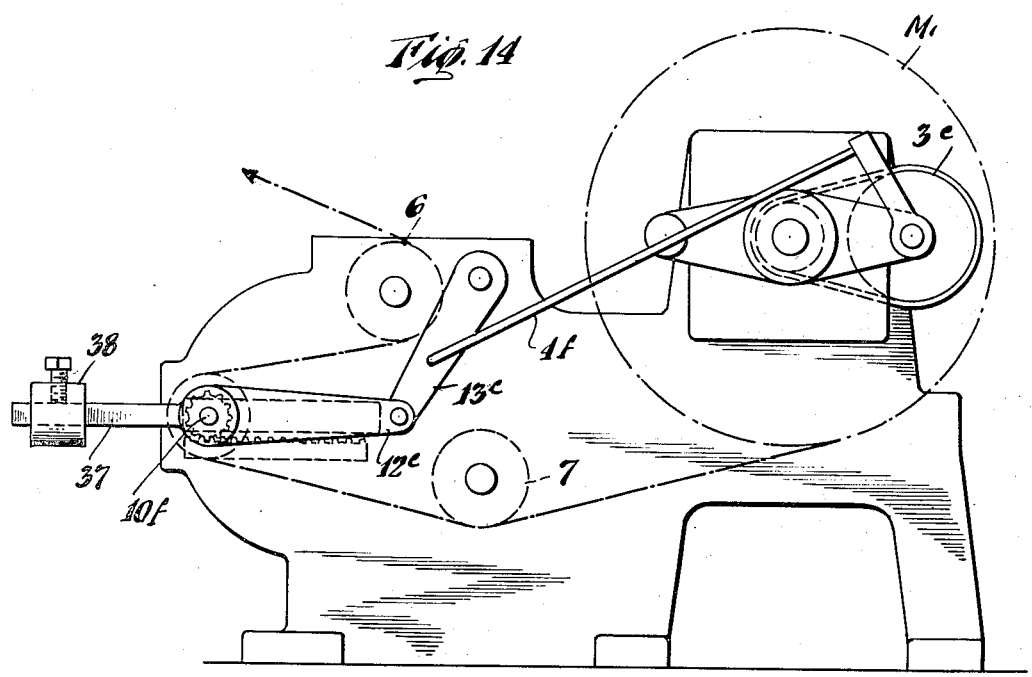
INVENTOR.
Thomas N. Carter
BY
ATTORNEY Patented Oct. 12, 1943

2,331,765

UNITED STATES PATENT OFFICE 2,331,765

TENSION CONTROL MECHANISM

Thomas N. Carter, Milwaukee, Wis., assignor to Cameron Machine Company, Brooklyn, N. Y., a corporation of New York Application July 29, 1942, Serial No. 452,741

7 Claims. (Cl. 242—75)

The present invention relates to machines employing tension control for a tensioned running web of flexible material. In machines of this character, such as winding machines and unwinding mechanism, a variable speed-control device is subjected to a progressively varying load and the effectiveness of said speed-control device is progressively varied in order to maintain a substantially constant tension on the web.

The main object and feature of this invention is to provide means whereby a constant tension on the web can be maintained or whereby, if desired, the effectiveness of the speed-control device can be varied disproportionately to the variation in load in a predetermined manner.

In the accompanying drawings the invention is disclosed in several concrete and preferred forms in which:

Fig. 1 is a view in side elevation of a center-wind winding machine embodying one form of the invention;

Fig. 2 is a fragmentary view looking in the direction of arrow 2 of Fig. 1;

Fig. 3 is a horizontal sectional view substantially on the plane of irregular line 3—3 of Fig. 1;

Figs. 4, 5 and 6 are diagrammatic views showing how different tensions or a uniform tension on the web can be obtained;

Fig. 9 is a view in side elevation showing the invention applied to an unwinding mechanism;

Fig. 10 is a view similar to Fig. 9 but showing a different form of the invention;

Fig. 11 is a fragmentary detail view looking in the direction of arrow 11 of Fig. 10;

Fig. 12 is a view in side elevation showing the invention applied both to a winding machine and to unwinding mechanism;

Fig. 13 is a view in side elevation of a still further modified form of the invention applied to a winding machine; and Fig. 14 is a view similar to Fig. 13 but showing that form of the invention applied to unwinding mechanism.

Figure 8:
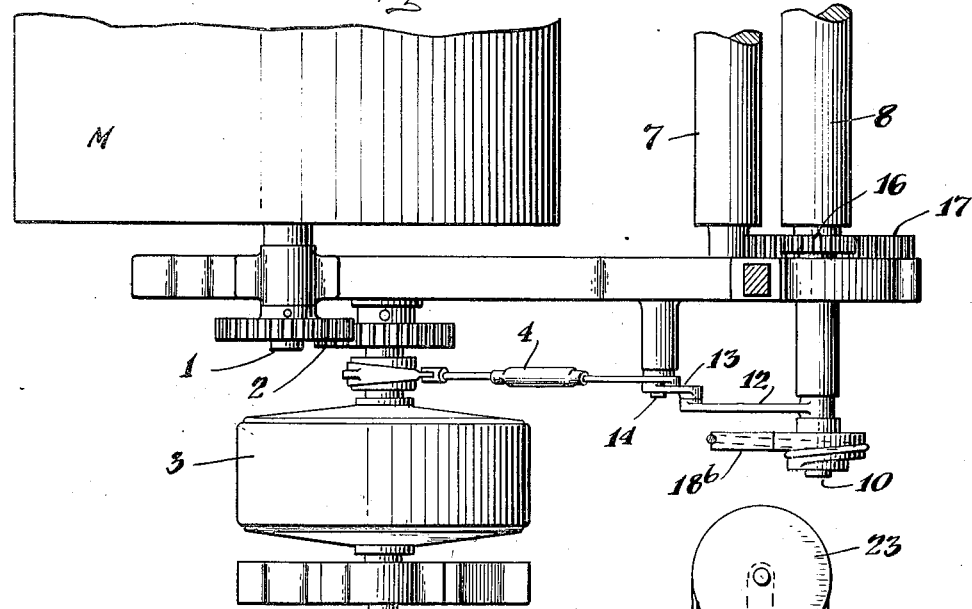
Fig. 8 is a view looking in the direction of arrow 8 of Fig. 7.

Considering first the form of the invention shown in Figs. 1 to 6 inclusive, which form shows a center-wind winding machine, 1 indicates the winding shaft driven by suitable gearing 2 from a variable speed-control device 3. Device 3 is here in the form of a variable slip-friction drive or clutch, which can be of any type, but is here what is commercially known as the Horton variable speed pulley, the effectiveness of which drive or clutch is varied by means of a clutch-rod 4 in a well-understood manner.

The running web of flexible material is indicated at 5 and can come from any suitable source of supply such as a mill-roll stand (not shown). Web 5, before passing to winding shaft 1, is trained around guide rollers 6 and 7, between which is located a tension control roll 8 that engages a bight 9 in the running web. Roll 8 is mounted on a carriage, here consisting of shaft 10 movable in a slot or guide 11 of the framework. Shaft 10 of the carriage is connected to clutch-control rod 4 by any suitable means such as yoke 12, loosely surrounding said shaft, which yoke is pivotally connected to the end of a lever 13, pivoted at 14 on the framework, to which lever 13 clutch-rod 4 is pivotally connected at 15. Roll 8 is loosely mounted on shaft 10 so as to spin freely in response to the flow of the running web. Shaft 10 carries fast thereon a pinion 16 that meshes with a stationary rack 17. The arrangement is in duplicate, one at each end of shaft 10, as will be understood, but only one pinion and one rack is shown. Mounted fast on and rotatable with shaft 10 is a sheave 18. 19 is a flexible connection, having one end 20 anchored on said sheave, and trained therearound. 21 is a weight carried on the free end of the flexible connection.

It will now be understood that, when the winding operation is initiated, winding shaft 1 should rotate at high speed because the diameter of wound material M is practically the same as the diameter of said shaft and therefore each rotation of the shaft takes up only a short length of web. As the winding continues, the wound material, as it accumulates on shaft 1, increases greatly in diameter so that, with each rotation of said shaft, an increasingly greater length of web material is taken up and therefore the speed of shaft 1 should be slowed down. It will be understood, however, that the speed-control device, slip-friction drive or clutch 3 is subjected to a very light load at the beginning of the winding operation, and that this load varies or increases progressively as the wound material accumulates on shaft 1. Therefore, the clutch-faces of slip-friction drive 3 are pressed together only slightly at the beginning of the winding operation and there is very little, if any, slippage. As the load on shaft 1 increases, the clutch-faces of the slip-friction drive are pressed more strongly together to furnish more power and the slippage increases.

Carriage or shaft 10, which is capable of a movement of traverse by rolling in slot 11 and by the intermeshing of pinions 16 with racks 17, is subjected to the opposing forces of the tensioned web acting against roll 8, which urges the carriage in one direction, and of weight 21 which tends to urge it in the other direction. The resultant of these opposing forces is transmitted from carriage or shaft 10 through connections 12 and 13 and clutch-rod 4 to slip-friction drive 3 to thereby vary its effectiveness. As previously indicated, slip-friction drive 3 imparts, at the beginning of the winding operation, a relatively small amount of power to the winding shaft. As the load on the winding shaft increases, the slip-friction drive is unable, without adjustment, to supply adequate power to said shaft and, consequently, the web slackens, or its tension relaxes. This slack is immediately taken up by a rolling movement of carriage 10 in slot 11 under compulsion of weight 21, and this movement is transferred through the connections described and clutch-rod 4 to the variable speed-control or slip-friction device 3 to thereby increase its effectiveness so as to supply more power to winding shaft 1. This action continues during the winding operation and causes carriage 10 to traverse slot 11. It is not intended by the foregoing to give the impression that the traverse movement of carriage 10 is uninterruptedly in one direction; the tension in the web may become too great and therefore, under the influence of said web acting against roll 8, carriage 10 may temporarily move backwards to lessen the effectiveness of slip-friction drive 3. Nonetheless, during the winding operation, carriage 10 will move from adjacent one end of slot 11 to a position nearer the other end thereof.

It has been found that, in winding flexible material such as paper on a shaft, there is a tendency, in spite of efforts to maintain constant tension, to wind the outer convolutions of the wound material under greater tension than the core, sometimes to such an extent that the core is unable to support the roll, with the result that said core is telescoped out of the roll. Sometimes, in winding an extremely soft roll, even if constant tension on the web is substantially maintained, the inner convolutions do not have sufficient body to support the outer convolutions. To correct this condition, it is desirable, with certain materials and under certain conditions, to wind the roll progressively softer. To accomplish this, it is proposed to provide means to progressively vary the effectiveness of the speed-control device disproportionately to the variation in load thereon. That is to say, in the case of slip-friction drive 3, on which the load increases as wound material accumulates on the winding shaft, the increase in its effectiveness should be somewhat less than the increase in load. Attention is now directed to sheave 18. As shown in Figs. 1, 3 and 4, this sheave has, in the present instance, the form of a snail-like cam. Flexible connection 19 is attached to or anchored on the cam-sheave at the point 20, which is the point of smallest diameter of said cam-sheave, and is wound helically over the cam surface 200 of the sheave to the point of its greatest diameter, from which point the free end of said flexible connection depends and supports weight 21. In Fig. 4, three positions in the traverse of carriage 10 during the winding operation are indicated at $x$, $y$ and $z$. Position $x$ shows the relation of the parts at the beginning of the winding operation, from which it will be seen that weight 21 exerts its maximum power, being suspended from the point of greatest diameter of the cam-sheave. As the winding of the material on shaft 1 continues, and carriage 10 moves forward in slot 11, flexible connection 19 will be unwound to a certain extent, as indicated at position $y$, and weight 21 will exert less power than previously, being now suspended from a smaller diameter of the cam sheave. If the winding operation continues, position $z$ may eventually be reached, in which position weight 21 will be least effective as it is suspended from the smallest diameter of the cam-sheave. The result is that, at the beginning of the winding operation, carriage 10, carrying roll 8, is urged toward the web by weight 21 when the latter is most effective but that, as carriage 10 traverses slot 11, the effectiveness of weight 21 becomes less and less, and this despite the fact that cam-sheave 18 is turned directly in proportion to the traverse of carriage 10. Consequently, by reason of the lessened effect of weight 21, the effectiveness of slip-friction drive 3 is increased to a less extent than the increase in its load and the roll of material will be wound progressively softer. By giving cam-sheave 18 the required shape, the variation in effectiveness of slip-friction drive 3 can be very accurately predetermined.

If, for any reason, the opposite result is desired, i. e. a somewhat softer core and somewhat harder outer convolutions, the arrangement shown in Fig. 5 can be employed, in which event cam-sheave 18 can be reversed so that initially weight 21 will be least effective as at position $x$ and finally most effective at position $z$.

Summing up the preceding constructions and operations, it will be seen that means are provided in combination with said carriage and weight to predeterminably and progressively vary the effectiveness of the speed-control device (here a slip-friction drive) disproportionately to the progressive variation in load thereon, and that said means consist of a rotatable member (here sheave 18 and/or extension 101 of shaft 10), and further consist of means (here pinion 16 and rack 17) to turn said sheave or rotatable member in direct proportion to the progressive travers of the carriage, and that, finally, there are connecting means (here cam surface 200 and flexible connection 19) between rotatable member 18 and weight 21 to progressively render the latter disproportionately effective as said rotatable member is turned proportionately to the progressive traverse of the carriage.

If it be desired to have substantially constant tension on the web throughout the winding operation, the arrangement shown in Fig. 6 can be used. As there shown, sheave 18a is circular, so that weight 21 will be equally effective in any position.

Figure 7:
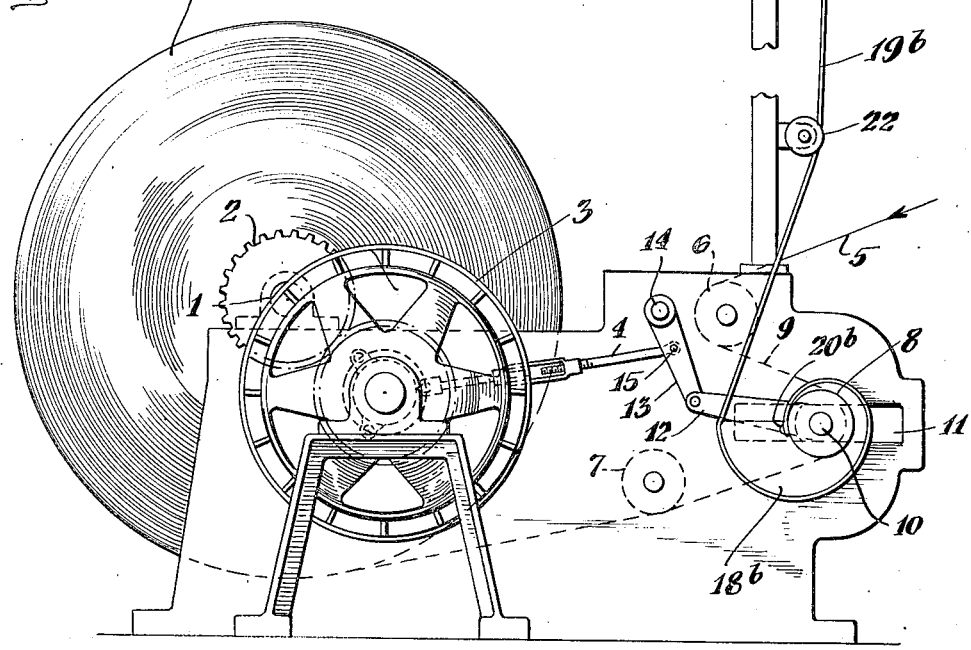
Fig. 7 is a view in side elevation of a modified form of the invention applied to a center-wind winding machine.

In Figs. 7 and 8 is shown a modified form of the invention. In this form of the invention, flexible connection 19b is anchored on a cam-sheave 18b, as previously, but passes thereafter over a guide roller 22 and a circular sheave 23, weight 21b being suspended from the free end of 19b. The action here is the same as that previously described.

In Fig. 9, the invention is shown applied to a variable speed control device, different from that shown in the previous figures, i. e. a variable brake mechanism. In this instance, a shaft 1c is the support for a roll of material $M^1$ to be unwound. This shaft is provided with a variable brake 3c which can be of any suitable construction such, for instance, as is shown in U. S. Patent No. 2,082,633. 4c indicates the brake control rod pivotally connected to lever 13c, pivoted at 14c, and in turn pivotally connected to yoke 12c, loosely mounted on shaft or carriage 10c, adapted to traverse slot 11c. Carried fast on shaft 10c, is a cam-sheave 18c to which is anchored a flexible connection 19c that passes over guide roller 22c and circular sheave 23c, a weight 21c being attached to the end of the flexible connection. It will be understood that the condition in an unwinding mechanism is the reverse of that prevailing in a winding machine. That is to say: in the unwinding mechanism the diameter of the material $M^1$ and the load is greatest at the beginning of the operation and decreases as the material is unwound. Consequently, the brake should be applied most strongly at the beginning of the operation so that shaft 1c will rotate slowly, and should gradually be released as the unwinding proceeds and carriage 10c traverses slot 11c. The arrangement of cam-sheave 18c is such that weight 21c is most effective at the beginning of the unwinding operation and less effective as the unwinding proceeds but, owing to the shape of the cam-sheave, the web will unwind under a constantly lessening tension so that said web will be wound on winding machine, indicated diagrammatically at W, with a hard core and softer outer convolutions.

In the examples of the invention thus far given, the cam-sheave has been shown as being mounted directly on carriage or shaft 10 or 10 with an exponent. This is not necessary. It is only necessary that said cam-sheave rotate in direct proportion to the traverse of carriage 10. In Figs. 10 and 11 is shown a modified form of the invention in which cam-sheave 18d is mounted on a shaft 30 rotated in direct proportion to the traverse of carriage 10d in slot 11d by means of flexible member 31 connected at one end to yoke 12d of carriage 10d, passing over guide 32 and anchored at 33 on member 34 of shaft 30. Cam-sheave 18d is mounted fast on shaft 30, and has a flexible connection 19d anchored thereon to support a weight 21d.

In Fig. 12 is shown an assemblage in which the tension control means are used both on the unwinding mechanism and the winding machine. As there shown, A indicates the unwinding mechanism constructed in accordance with the disclosure of Fig. 9 and B is a winding machine constructed according to the disclosure of Figs. 1 to 3 inclusive. C is a processing mechanism, such as a printing machine, that acts on the web in passing from A to B. It will be seen that the tension of the web is controlled independently on opposite sides of C.

In Fig. 13, which shows a winding machine, carriage or shaft 10e, instead of controlling a flexible connection, carries an arm 35 that turns in proportion to the rolling movement of said shaft 10e, and carries at its outer end an adjustable weight 36. Shaft 10e controls rod 4e of the slip-friction device in a manner like that previously described. At the beginning of the winding operation, said arm 35 may stand in a horizontal position where weight 36 will be most effective but, as carriage 10e advances, said arm 35 is turned in an upward direction, thereby rendering weight 36 less and less effective as it approaches the vertical.

In Fig. 14, which shows an unwinding mechanism, carriage or shaft 10f carries an arm 37, that turns in proportion to the rolling movement of said shaft 10f, and carries at its end an adjustable weight 38. Shaft 10f controls rod 4f of the brake mechanism in a manner like that previously described. At the beginning of the unwinding operation said arm 37 may stand in a horizontal position where weight 38 will be most effective but, as carriage 10f advances, said arm 37 is turned in an upward direction, thereby rendering weight 38 less and less effective as it approaches the vertical.

It will thus be observed that in Figs. 1 to 12, the connecting means between the rotatable member and the weight include flexible connections, whereas in Figs. 13 and 14 said connecting means consist of arms 35 and 37.

I claim:

1. In a winding machine for a running web of flexible material in which the winding shaft is driven through a variable slip-friction drive the load on which progressively increases as wound material accumulates on said winding shaft, and in which the effectiveness of said slip-friction drive is progressively varied by the traverse of a carriage having a roll that engages a bight in said running web, and in which the traverse of the carriage is controlled by the opposing forces exerted by said web under tension and by a weight, means to progressively vary the effectiveness of the slip-friction drive as said load progressively increases, including: a rotatable sheave, means to turn said sheave in proportion to the traverse of the carriage, a flexible connection anchored at one end on said sheave and wound therearound, and a weight on the free end of said flexible connection.

2. In a machine employing tension control for a tensioned running web of flexible material, in which machine a variable speed-control device is subjected to a progressive variation in load and in which the effectiveness of said speed-control device is progressively varied by the traverse of a carriage having a roll that engages a bight in said running web, and in which the traverse of the carriage is controlled by the opposing forces exerted by said web under tension and by a weight, means to predeterminably and progressively vary the effectiveness of the speed-control device disproportionately to said variation in load, including: a rotatable cam-sheave, means to turn said cam-sheave in direct proportion to the traverse of said carriage, a flexible connection anchored at one end on said cam-sheave and trained thereover, and a weight on the free end of said flexible connection.

3. In a winding machine for a running web of flexible material in which the winding shaft is driven through a variable slip-friction drive the load on which progressively increases as wound material accumulates on said winding shaft, and in which the effectiveness of said slip-friction drive is progressively varied by the traverse of a carriage having a roll that engages a bight in said running web, and in which the traverse of the carriage is controlled by the opposing forces exerted by said web under tension and by a weight, means to predeterminably and progressively vary the effectiveness of the slip-friction drive disproportionately to said increase in load, including: a rotatable cam-sheave, means to turn said cam-sheave in direct proportion to the traverse of said carriage, a flexible connection anchored at one end on said cam-sheave and trained thereover, and a weight on the free end of said flexible connection.

4. In unwinding mechanism for a web of flexible material in which the shaft that supports the unwinding tensioned web is controlled by a variable brake the load on which progressively decreases as the web is unwound, and in which the effectiveness of said brake is progressively varied by the traverse of a carriage having a roll that engages a bight in the tensioned running web unwound from said shaft, and in which the traverse of the carriage is controlled by the opposing forces exerted by said web under tension and by a weight, means to predeterminably and progressively vary the effectiveness of the brake disproportionately to said decrease in load including: a rotatable cam-sheave, means to turn said cam-sheave in direct proportion to the traverse of said carriage, a flexible connection anchored at one end on said cam-sheave and trained thereover, and a weight on the free end of said flexible connection.

5. In a machine employing tension control for a tensioned running web of flexible material, in which machine a variable speed-control device is subjected to a progressively varying load and in which the effectiveness of said speed-control device is progressively varied by the traverse of a carriage having a roll that engages a bight in said running web, and in which the traverse of the carriage is controlled by the opposing forces exerted by said web under tension and by a weight, means to predeterminably and progressively vary the effectiveness of the speed-control device disproportionately to said progressive variation in load, including, in combination with said weight and said carriage, a rotatable member, means to turn said rotatable member in direct proportion to the progressive traverse of said carriage, and connecting means between said rotatable member and said weight to progressively render the latter disproportionately effective as the rotatable member is turned proportionately to the progressive traverse of said carriage.

6. In a winding machine for a running web of flexible material in which a winding shaft is driven through a variable slip-friction drive the load on which progressively increases as wound material accumulates on said winding shaft, and in which the effectiveness of said slip-friction drive is progressively varied by the progressive traverse of a carriage having a roll that engages a bight in said running web, and in which the progressive traverse of the carriage is controlled by the opposing forces exerted by said web under tension and by a weight, means to predeterminably and progressively vary the effectiveness of the slip-friction drive disproportionately to said increase in load, including, in combination with said weight and said carriage, a rotatable member, means to turn said rotatable member in direct proportion to the progressive traverse of said carriage, and connecting means between said rotatable member and said weight to progressively render the latter disproportionately effective as the rotatable member is turned proportionately to the progressive traverse of said carriage.

7. In unwinding mechanism for a running web of flexible material in which the shaft that supports the unwinding web is controlled by a variable brake the load on which progressively decreases as the web is unwound, and in which the effectiveness of said brake is progressively varied by the progressive traverse of a carriage having a roll that engages a bight in the running web unwound from said shaft, and in which the progressive traverse of the carriage is controlled by the opposing forces exerted by said web under tension and by a weight, means to predeterminably and progressively vary the effectiveness of the brake disproportionately to said decrease in load, including, in combination with said weight and said carriage, a rotatable member, means to turn said member in direct proportion to the progressive traverse of said carriage, and connecting means between said rotatable member and said weight to progressively render the latter disproportionately effective as the rotatable member is turned proportionately to the progressive traverse of said carriage.

THOMAS N. CARTER.